3,128,266
POLYMERIZATION OF ETHYLENE
Donald H. Antonsen, Glen Mills, and Richard S. Stearns, Malvern, Pa., assignors to Sun Oil Company, Philadelphia, Pa., a corporation of New Jersey
Filed Dec. 23, 1960, Ser. No. 78,095
4 Claims. (Cl. 260—94.9)

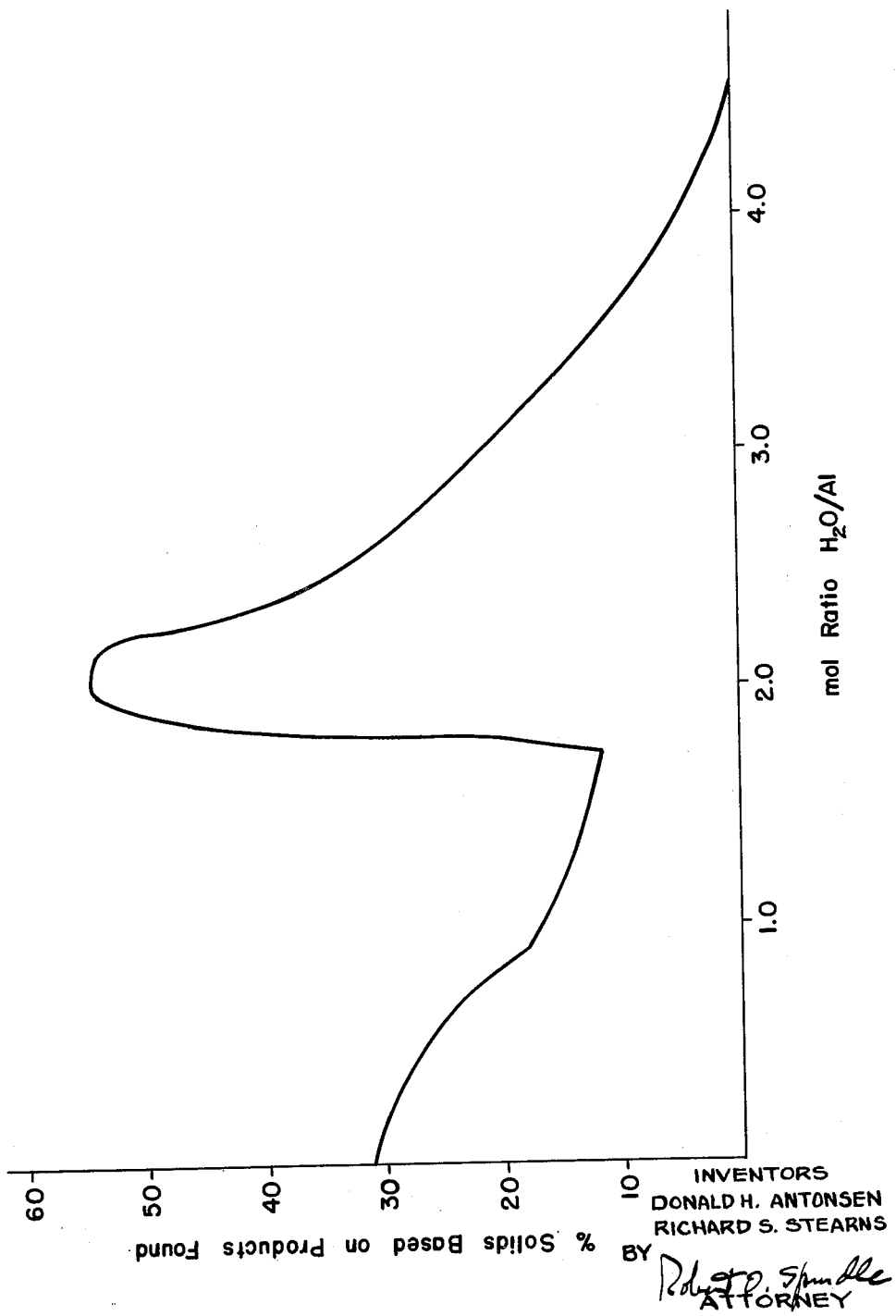

This invention relates to the polymerization of ethylene, and more particularly to a process for the production, at low temperatures and pressures, of a moderate molecular weight solid polyethylene, having a melting point in the vicinity of 110–115° C., which finds particular utility in blends with paraffin wax in order to reduce the flaking tendency of the wax when applied to milk cartons.

Low molecular weight polyethylenes having physical characteristics similar to the polyethylene produced in our new process are known to the art. Such polyethylenes are manufactured by polymerizing ethylenes in the presence of azo or peroxide catalysts at extremely high pressures, in excess of 1200 atmospheres. The equipment necessary to confine the ethylene at these high pressures is very costly, and the high investment cost imposes a severe economic penalty on the process. Recently it has been found possible to polymerize ethylene at low pressures by contacting the monomer with a coordination complex catalyst, such as the reaction product of titanium tetrachloride and an aluminum alkyl suspended in an inert hydrocarbon reaction medium. Polyethylene produced by this process, however, has a high molecular weight, is highly crystalline, and has a melting point in the vicinity of 130° C. This combination of properties makes it extremely difficult to disperse in paraffin wax, and for this reason such polyethylenes are not commercially used as wax additives.

We have now found that low molecular weight, low melting polyethylene suitable as a wax additive may be prepared by contacting ethylene at low or moderate pressure with a titanium tetrachloride-aluminum alkyl sesquihalide catalyst complex which has been modified by the addition of from about 1.8 to 2.5 mols of water per atom of aluminum. The atomic ratio of aluminum to titanium in the catalyst complex should be from 0.25:1 to 0.75:1, preferably in the vicinity of 0.5:1. Polymerization must be carried out in the absence of oxygen, and preferably in the presence of an inert hydrocarbon solvent for ethylene such as hexane, heptane, or octane, or mixtures thereof, at temperatures of from 0° C. to 150° C., but, since the reaction proceeds readily at room temperature, such temperature is preferred. The reaction may be carried out at ethylene pressures of from about 5 p.s.i.g. to about 150 p.s.i.g. or even higher, but it is preferred to use pressures at the lower end of this range in order to avoid the expense of high pressure equipment.

Sesquihalides useful in the practice of our process include aluminum ethyl sesquichloride, aluminum propyl sesquichloride, aluminum isobutyl sesquichloride, and other alkyl sesquichlorides and their bromine analogues. It is essential to the present invention that the aluminum compound and the titanium tetrachloride be mixed and allowed to react to a point of incipient precipitation prior to addition of the water, since if all three catalyst components are mixed simultaneously, a satisfactory yield of solid polyethylene is not obtained.

In order that those skilled in the art may more fully understand the nature of our invention and the manner of carrying it out, the following examples are given.

EXAMPLE 1

Normal heptane was purified by distillation from sodium, and 470 cc. were placed in a flask in a dry box. 1.71 cc. of a 3.18 molar solution of aluminum ethyl sesquichloride ($Al_2Et_3Cl_3$) in heptane and 8.05 cc. of a 1.20 molar solution of titanium tetrachloride in heptane were then added to the flask, the atomic ratio of aluminum to titanium being 0.57:1. The catalyst system was aged for 15 minutes at 25° C. and the flask was then pressured to 10 p.s.i.g. with ethylene and the pressure was maintained while holding the temperature at 20° C. for a period of 3 hours. The flask was then depressured, and the catalyst was deactivated with methanol. Solid polymer formed in the reaction in the amount of 10.3 grams was filtered out and washed with methanol. The heptane was distilled from the filtrate and 23.7 grams of an oily polymer were recovered. The solid polymer had a molecular weight of 89,000 as determined by the intrinsic viscosity method, and had a softening point of 118° C. and melted at 130° C. This polyethylene is incompatible with paraffin wax.

EXAMPLES 2 TO 16

The procedure of Example 1 was followed, except that various quantities of water were added to the catalyst system after aging the aluminum sesquichloride with the titanium tetrachloride, with the exception of Example 16, where the water was added prior to aging the other catalyst components. Results obtained in these examples are given in the following table, and are graphically represented in the accompanying drawing.

Table I

| Example No. | Mol Ratio, $H_2O/Al$ | Grams Solid | Grams Oil | Percent Solids in Product |
|---|---|---|---|---|
| 2 | 0.18 | 10.4 | 22.7 | 31.4 |
| 3 | 0.55 | 6.8 | 17.5 | 27.0 |
| 4 | 0.92 | 5.2 | 24.5 | 17.5 |
| 5 | 1.37 | 3.6 | 23.7 | 13.2 |
| 6 | 1.74 | 3.7 | 28.2 | 11.6 |
| 7 | 1.79 | 5.3 | 30.1 | 15.0 |
| 8 | 1.82 | 7.6 | 25.0 | 23.3 |
| 9 | 1.84 | 13.5 | 17.6 | 43.4 |
| 10 | 2.00 | 12.2 | 10.5 | 53.8 |
| 11 | 2.28 | 17.2 | 16.8 | 50.5 |
| 12 | 2.50 | 6.5 | 13.2 | 33.0 |
| 13 | 2.74 | 4.5 | 12.4 | 26.7 |
| 14 | 3.19 | 0.8 | 3.9 | 17.0 |
| 15 | 4.56 | (¹) | (¹) | (¹) |
| 16 | 2.00 | 5.0 | 29.3 | 14.6 |

¹ No reaction.

Physical properties of representative polymers are given in the following table.

Table II

| Example No. | Intrinsic Viscosity | M.W. by I.V. | Softening Point, ° C. | Melting Point, ° C |
|---|---|---|---|---|
| 1 | 1.40 | 89,000 | 118 | 130 |
| 3 | 1.19 | 70,000 | 90 | 105 |
| 5 | 0.79 | 38,000 | 95 | 112 |
| 11 | 2.26 | 180,000 | 105 | 115 |

With the exception of the polyethylene of Example 1, the polymers are compatible with paraffin wax, and may be used in blends therewith to impart flake resistance thereto in the same manner as have been low molecular weight low density polyethylenes manufactured by the high pressure processes of the past. It will be noted however, from the data given, that the yields of solid polymer are attractive only when the atomic ratio of water to aluminum in the catalyst system is between 1.8:1 and 2.5:1.

The invention claimed is:
1. A process for polymerizing ethylene which comprises contacting ethylene in an inert hydrocarbon solvent with a catalyst system prepared by reacting titanium tetrachloride and an aluminum alkyl sesquihalide until at least incipient precipitation takes place, and then adding water, wherein the atomic ratio of aluminum to titanium is from 0.25:1 to 0.75:1, and the mol ratio of water to aluminum is from 1.8:1 to 2.5:1, and recovering a solid polymer.

2. The process according to claim 1 in which the aluminum alkyl sesquihalide is aluminum ethyl sesquichloride.

3. Process for preparing a catalytic system for the polymerization of ethylene which comprises mixing titanium tetrachloride with an aluminum alkyl sesquihalide in an inert liquid hydrocarbon, reacting the foregoing compounds until at least incipient precipitation takes place, and then adding water to the mixture, wherein the atomic ratio of aluminum to titanium is from 0.25:1 to 0.75:1 and the mol ratio of water to aluminum is from 1.8:1 to 2.5:1.

4. The process according to claim 3 in which the aluminum alkyl sesquihalide is aluminum ethyl sesquichloride.

References Cited in the file of this patent
UNITED STATES PATENTS
2,984,658 Seydel _____ May 16, 1961

OTHER REFERENCES
"Polythene," by Renfrew et al., Iliffe & Sons, London, 2nd edition (1960), page 379 pertinent.